UNITED STATES PATENT OFFICE.

VALDEMAR CHRISTENSEN, OF MEXICO, MEXICO.

FODDER AND METHOD OF MAKING SAME.

1,073,591.     Specification of Letters Patent.     Patented Sept. 23, 1913.

No Drawing.     Application filed July 30, 1912. Serial No. 712,262.

*To all whom it may concern:*

Be it known that I, VALDEMAR CHRISTENSEN, a subject of the King of Denmark, residing at Mexico city, Federal District, Mexico, have invented certain new and useful Improvements in Fodder and Methods of Making Same, of which the following is a specification.

This invention relates to a product that will satisfy all scientific and practical requirements for a good fodder, while it contains carbo-hydrate and organic nitrogenous substances and several salts, especially phosphates, besides a proportion of cellulose as an indigestible matter, for invigorating the intestines, and whereby the quantity of excrements is augmented.

I have produced a fodder, which the live stock willingly eat and stand very well, that will augment the formation of milk in cows, increases the working power of horses, mules, etc., and is useful for fattening of cattle; it is cheap, easy to transport and may be well conserved. At the same time it renders valuable, certain secondary agricultural products which were either almost wasted or used in profitless industrial enterprises.

The incorporated substances of which my improved fodder is composed I divide in three groups namely:—

I. Carbo-hydrate matter, which I extract from different fleshy and saccharine plants, especially the *Agaves*, the cacti and the like, growing on the deserts and dry tracts of land, using the pulp, the juice or the entire leaves without the hard cuticle (epidermis):

Among the Mexican fibrous *Agave* plants exploited due to the fibers, I mention the henequen (*Agave rigida*), lechuguilla, (*Agave fteterocantha*) and zapupe (*Agave lespinassei y aboriginum*). The juicy pulp stripped from the henequen fibers, and the other mentioned *Agaves*, has not been successfully converted into alcohol while, besides fermentable sugar, it contains "pentosans" (a carbo-hydrate composed of sugar and gums) which can not be fermented, but this pentosan is of nutritive value to the cattle, as well as the fermentable sugar. The flesh and juice of the leaves of similar *Agave* plants, like those of the "*Agave de pulque*" (*Agava americana* or *mexicana* and varieties such as *Agave atrovirens*) and the *Agave de mezcal*, exploited mainly due to their flowering, ripe saps, may also be used by chopping, triturating or pressing the leaves, which contain a green juice, different from the mentioned saps. The valuable flowering saps are employed for other purposes with greater profit. Furthermore the saccharine pulp of the cacti, especially the nopals (*Opuntia*) and the organs (*Cereus*) may be used. The varieties of the nopals without thorns have been used in natural state as a fodder, likewise the leaves of some of the mentioned *Agaves*,—but not for the preparing of a complete conservable nutriment as I have invented. The juice or pulp of the entire leaves is concentrated by vaporation, to render a conservable vegetal extract containing about 20% of moisture, or it is dried to contain about 10% of moisture, the product being rich in saccharine and gummy substances, namely digestible carbo-hydrate matter, besides smaller quantities of other nutritive compositions. The sugar and gum in this extract will substitute the fecula of the cereals, to which it equals in nutritive value, but being more rapidly and easily assimilated; this extract would be similar to fodder- and sugar-beets, supposing they were deprived of the principal part of their moisture.

II. Organic nitrogen: For this I employ healthy concentrated or dried blood, from the slaughter houses, preferably dried; this contains large quantities of albuminoid matter easily digestible and furthermore phosphates as well as other useful mineral substances:

It is used and known that blood is better conserved when sugar is added; thus when blood is intermingled with my saccharine extract, putrefying is avoided.

Instead of the blood, there may be employed a vegetal waste material rich in proteids, like those obtained in the oil cake industry or the residues left after the pressing of oleaginous seeds, or bean meal.

III. Substances principally containing cellulose, and therefore more or less indigestible, like dry straws, stems of maize, and especially the residues remaining when pressing the pulp for the preparation of the said carbo-hydrate matter of the first group:

The necessary quantities of the materials of the groups I and II, or of the three groups, are mingled together, in proportions depending upon the previous analysis of each component, to obtain a fodder of a composition and nutritive value similar to maize and other cereals; the saccharine and gummy substances being assimilatable carbo-hydrates as well as the fecula. The mixed components are dried if necessary, ground and compressed into compact cakes in which form they may be stored occupying comparatively small spaces, or they may remain disseminated.

The quantities may be more or less as shown in the following examples:

A. Using the concentrated or dried juice of the *Agaves* and cacti-plants, free from cellulose:

80 parts of the carbo-hydrate containing extract of the first group (of about 20% moisture), 10 parts of dried blood, and 20 parts of the dry substances containing cellulose of the third group, resulting about 100 parts after drying the mixture.

70 parts of the dry carbo-hydrate matter of the first group (of about 10% moisture), 10 parts of dried blood, and 20 parts of the dry substances containing cellulose of the third group, which gives a total of 100 parts.

70 parts of the carbo-hydrate extract of the first group (of about 20% moisture), 20 parts of oil-cake meal, or bean meal, and 20 parts of the dry cellulose containing substances of the third group, resulting about 100 parts after drying.

60 parts of the dry carbo-hydrate matter of the first group (of about 10% moisture), 20 parts of oil-cake meal or bean meal, and 20 parts of the dry cellulose containing substances of the third group = 100 parts.

B. Using the concentrated or dried pulp (which by itself contains cellulose) of the *Agaves* and cacti-plants:

100 parts of the carbo-hydrate containing extract of the first group (of about 20% moisture) 10 parts of dried blood, resulting about 100 parts after drying.

90 parts of the dry carbo-hydrate matter of the first group (of about 10% moisture) and 10 parts of dried blood = about 100 parts.

90 parts of the carbo-hydrate containing extract of the first group (of about 20% moisture) and 20 parts of oil-cake meal or bean meal, resulting about 100 parts after drying.

80 parts of the dry carbo-hydrate matter of the first group (about 10% of moisture) and 20 parts of oil-cake meal or bean meal, giving a total of 100 parts.

As it will appear from the foregoing specification I have invented a completely nutritious fodder for cattle mainly composed of waste materials, up to the present very little exploited.

What I claim is:—

1. A conservable, complete fodder consisting of concentrated saccharine juice of the *Agave* plants, and substances rich in organic nitrogenous matter mixed together, dried and ground.

2. A conservable, complete fodder consisting of concentrated saccharine juice of the *Agave* plants, substances rich in organic nitrogenous matter, and cellulose-containing products mixed together, and ground.

3. The method of making a conservable, complete fodder which consists in extracting the saccharine juice from the *Agave* plants, evaporating the same to the point of conservation, mixing the concentrated juice with substances rich in organic nitrogenous matter, drying the mixture, and grinding the dry mass.

4. The method of making a conservable, complete fodder which consists in extracting the saccharine juice from the *Agave* plants, evaporating the same to the point of conservation, mixing the concentrated juice with substances rich in organic nitrogenous matter and with cellulose-containing products, drying the mixture, and grinding the dry mass.

In testimony whereof I have affixed my signature in the presence of two witnesses.

VALDEMAR CHRISTENSEN.

Witnesses:
N. ARCOS,
FRED H. GUYANT.